(12) United States Patent
Botet et al.

(10) Patent No.: US 6,816,653 B2
(45) Date of Patent: Nov. 9, 2004

(54) PASSIVE ALIGNMENT OF OPTICAL FIBERS WITH OPTICAL ELEMENTS

(75) Inventors: Alfredo D. Botet, Painted Post, NY (US); Stephen J. Caracci, Elmira, NY (US); Adam J. Fusco, Painted Post, NY (US); Sean M. Garner, Elmira, NY (US); Cheng-Chung Li, Painted Post, NY (US); Daniel R. Sempolinski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/373,994

(22) Filed: Feb. 25, 2003

(65) Prior Publication Data

US 2004/0165829 A1 Aug. 26, 2004

(51) Int. Cl.⁷ ................................................ G02B 6/30
(52) U.S. Cl. ............................ 385/49; 385/136; 385/137
(58) Field of Search ............................ 385/49, 136–137

(56) References Cited

U.S. PATENT DOCUMENTS

| | | | |
|---|---|---|---|
| 4,730,892 A | 3/1988 | Anderson et al. | 350/96.21 |
| 4,735,677 A | 4/1988 | Kawachi et al. | 156/633 |
| 4,750,799 A | 6/1988 | Kawachi et al. | 350/96.11 |
| 4,765,702 A | 8/1988 | Dohan et al. | 350/96.12 |
| 4,767,174 A | 8/1988 | Carenco et al. | 350/96.2 |
| 4,796,975 A | 1/1989 | Lukas et al. | 350/320 |
| 4,828,362 A | 5/1989 | Skinner et al. | 350/320 |
| 4,856,865 A | 8/1989 | Lee | 350/96.21 |
| 4,883,743 A | 11/1989 | Booth et al. | 430/321 |
| 4,969,705 A | 11/1990 | Stoy et al. | 350/96.21 |
| 4,973,126 A | 11/1990 | Degani et al. | 350/96.21 |
| 5,029,972 A | 7/1991 | Lukas et al. | 350/96.21 |
| 5,046,808 A | 9/1991 | Chang | 385/13 |
| 5,080,458 A | 1/1992 | Hockaday | 385/14 |
| 5,150,440 A | 9/1992 | Booth | 385/49 |
| 5,159,653 A | 10/1992 | Carpenter et al. | 385/95 |
| 5,239,601 A | 8/1993 | Denis et al. | 385/49 |
| 5,311,604 A | 5/1994 | Rogner et al. | 385/14 |
| 5,359,687 A | 10/1994 | McFarland et al. | 385/49 |
| 5,420,688 A | 5/1995 | Farah | 438/31 |
| 5,891,747 A | 4/1999 | Farah | 438/31 |
| 6,266,472 B1 | 7/2001 | Norwood et al. | 385/137 |
| 6,298,192 B1 * | 10/2001 | Yoo et al. | 385/137 |
| 6,335,149 B1 | 1/2002 | Xu et al. | 430/321 |
| 6,360,043 B1 | 3/2002 | Bostock et al. | 385/49 |

FOREIGN PATENT DOCUMENTS

| | | | |
|---|---|---|---|
| EP | 0 429 877 | 6/1985 | G02B/6/36 |
| EP | 0 065 096 | 12/1985 | G02B/6/24 |
| EP | 0 290 253 | 1/1994 | G02B/6/255 |
| JP | 58-072385 | 11/1984 | H01S/3/18 |
| JP | 59-101605 | 12/1984 | G02B/5/174 |
| JP | 03-157805 | 12/1988 | G02B/6/30 |
| WO | WO 87/05119 | 8/1987 | G02B/6/38 |
| WO | WO 91/13378 | 9/1991 | G02B/6/30 |
| WO | WO 95/06270 | 3/1995 | G02B/6/30 |

\* cited by examiner

*Primary Examiner*—Michael G. Lee
*Assistant Examiner*—Seung H Lee
(74) *Attorney, Agent, or Firm*—Timothy M. Schaeberle

(57) ABSTRACT

Articles and methods for manufacturing pigtailed planar optical devices are disclosed. The articles and methods include providing a tool including a substrate having a stepped region. The tool is capable of forming elements such as grippers or waveguides on a device substrate having different heights.

14 Claims, 15 Drawing Sheets

US 6,816,653 B2

PASSIVE ALIGNMENT OF OPTICAL FIBERS WITH OPTICAL ELEMENTS

FIELD OF THE INVENTION

This invention relates to passive alignment of optical elements, particularly optical fibers, with other optical elements.

BACKGROUND OF THE INVENTION

Optical waveguide devices formed on substrates are often referred to as planar integrated optical devices or planar photonic devices. When an optical waveguide device is to be utilized in an optical communication system, it is usually coupled to at least one optical fiber or an optical element at one point, and often at many points, on the substrate. An optical waveguide device which has been coupled to lengths of optical fibers for ease of insertion into an optical system is sometimes referred to as a "pigtailed" waveguide device by those skilled in the art. Light propagates through the core region of optical fibers, and these core regions can be as small as a few microns in diameter. Alignment of the fiber to the waveguide on the substrate is critical to ensure efficient light coupling between the fiber and the waveguide. Various articles exist to align optical fibers to substrates incorporating optical waveguide devices. The need for critical alignment tolerances has resulted in a high degree of complexity and cost for these devices and methods of the prior art. There are many descriptions of methods which utilize silicon V-grooves as a positioning element, which are based on the preferential etching of certain crystalline orientations of silicon. This is accomplished by a series of lithographic steps including resist coating and exposure, followed by liquid etching. However, the V-groove, once fabricated, serves only to position the optical fiber relative to the surface of the silicon wafer. It still remains to position the fiber end relative to the waveguide end. This is usually accomplished by micromanipulation of the two components relative to each other followed by fixing of the alignment with an optical quality glue or adhesive. Micromanipulation is an expensive and time-consuming process when used in the manufacturing operation. Alternatively, the V-groove and optical fiber can be positioned relative to the waveguide by the use of additional positioning elements, but these also increase the complexity and cost of the method. Also, the V-groove techniques serve to position an optical fiber relative to some surface, such as that of the silicon itself, but the V-groove does not provide any force to retain the optical fiber in position. That is, the optical fiber can easily slip out of the groove unless one or more additional elements are present to provide some retaining force. Typically, a cover plate or a second substrate containing V-grooves is forced down in contact with the optical fibers to hold them in the V-grooves and optical cement or photopolymer is used to hold the assembly together.

Several methods and devices exist for positioning optical fibers on a substrate which also includes a waveguide or integrated optical device. However, the techniques are complex or they lack the sufficient retaining force necessary to provide a simple, low-cost, yet effective method of providing such a coupling. Thus, a need exists for devices and methods which allow for simple, accurate positioning of optical fibers to optical waveguides on a variety of desirable substrates. It would also be desirable to provide methods and devices that do not require many additional manufacturing steps or positioning elements or elaborate alignment by micromanipulators and which provide a secure retaining force to the optical fiber without the need for additional elements held in place by optical adhesives or thermal heat treatments.

SUMMARY

Certain embodiments of the invention relate to methods and articles for manufacturing pigtailed planar optical devices. The various embodiments of the present invention provide relatively simple and inexpensive methods and articles for aligning optical elements such as optical fibers with another optical element on a substrate. The methods and articles do not require adhesives for securing the fibers to substrates. It is to be understood that both the foregoing general description and the following detailed description are exemplary and are intended to provide further explanation of the invention as claimed.

DETAILED DESCRIPTION

Before describing several exemplary embodiments of the invention, it is to be understood that the invention is not limited to the details of construction or process steps set forth in the following description. The invention is capable of other embodiments and of being practiced or carried out in various ways.

The various embodiments of the present invention relate to methods and planar optical devices that include gripping elements adapted to secure and align optical elements, and in particular, optical fibers, to an optical element associated with the device. According to certain embodiments, methods and articles include a novel forming tool for forming gripping elements adapted to secure and align optical fibers on a substrate and to form an optical element on the same substrate.

According to certain embodiments, each gripping element includes at least a pair of flexible members, e.g., polymeric, generally trapezoidally shaped members. Gripping elements or grippers are versatile structures fabricated from flexible polymeric materials. Details on the configuration and construction of gripping elements are described in U.S. Pat. Nos. 6,266,472 and 5,359,687, both of which are incorporated herein by reference. U.S. Pat. No. 6,266,472 describes polymer gripping elements that are used in splicing optical fibers.

Figure 1:
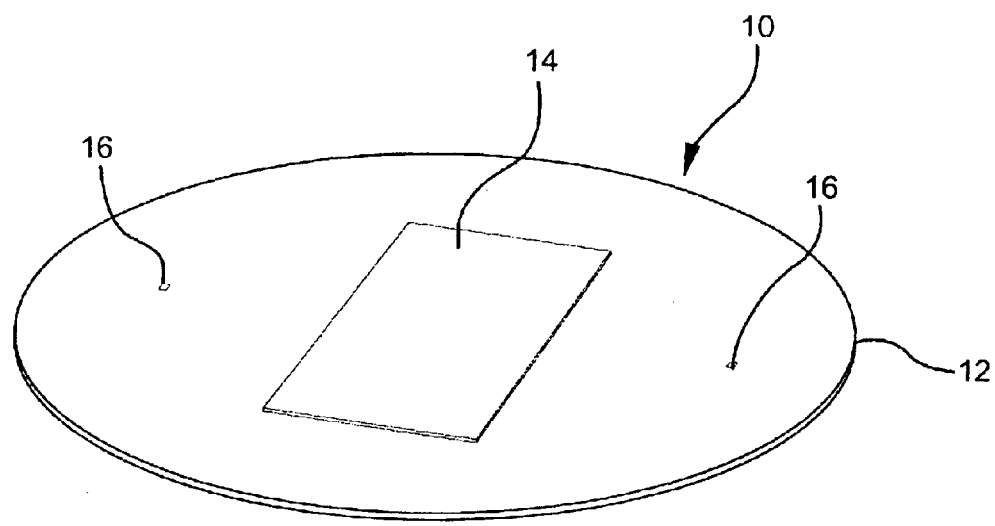
FIG. 1 is a perspective view of an unfinished tool for manufacturing pigtailed planar optical devices showing a substrate having a stepped region according to one embodiment of the invention.
Figure 2:
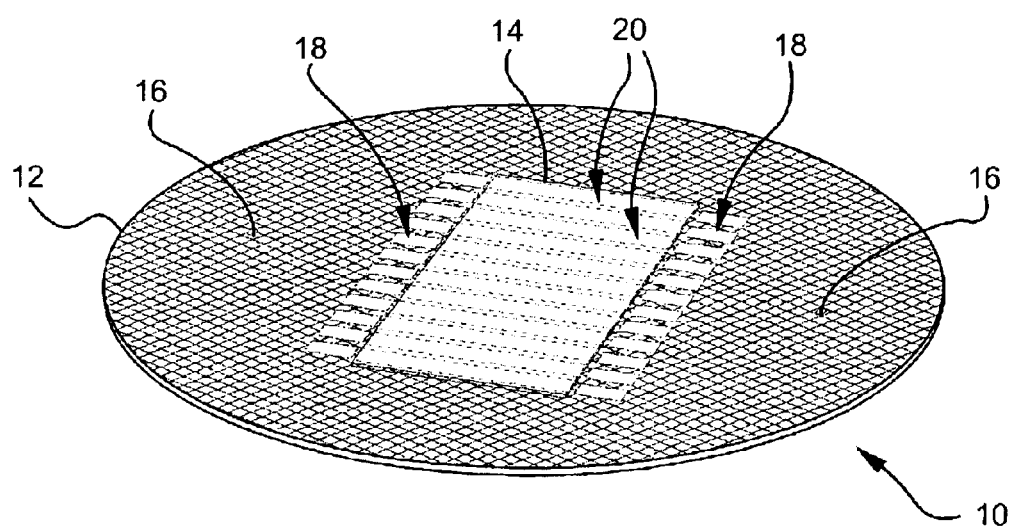
FIG. 2 is a perspective view of a finished tool for manufacturing pigtailed planar optical devices according to one embodiment of the invention.

An exemplary embodiment of the invention is shown in FIGS. 1–2. FIGS. 1 and 2 respectively illustrate general perspective views of intermediate and final stages of a tool 10 used for making pigtailed planar optical devices according to one embodiment of the invention. FIG. 1 shows the intermediate version of the tool 10 comprising a substrate 12, having a stepped region 14; this preliminary or intermediate tool is subsequently modified to form the final tool shown in FIG. 2 used for making pigtailed planar optical devices according to one embodiment. The intermediate tool 10 preferably includes a pair of reference marks 16, the use of which will be discussed below. The tool substrate 12 can be made from a wide variety of materials, including, but not limited to, glass, silica, semiconductor materials, ceramics, and plastics. The stepped region 14 can be formed by adhering or otherwise attaching a piece of material, of the same or different type, to the substrate 12, or alternatively, the stepped region could be formed by removing material from the outer peripheral portion of the substrate 12 to form the stepped region 14. For example, the stepped region could be formed by grinding material from the portion of the substrate 12 not intended to be stepped or by masking and etching the non-stepped portion using techniques known in the art. In certain embodiments, it may be desirable to provide raised or recessed sections (not shown) on the stepped region 14 to provide a multi-tiered, stepped region, which can be used to form features on the device substrate that have different heights.

Figure 6:
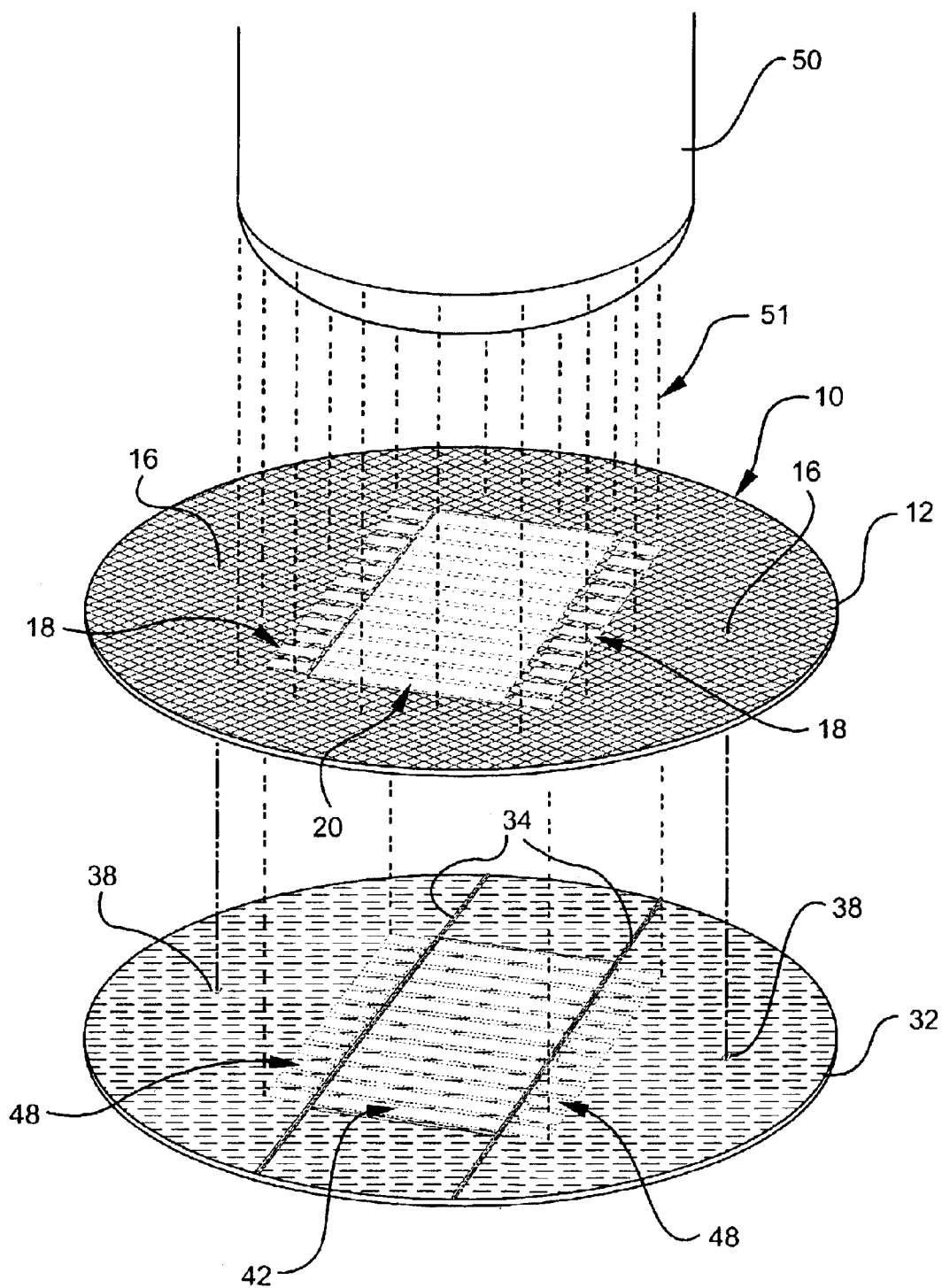
FIG. 6 is a general perspective view of a manufacturing step showing an ultraviolet light being applied to the assembly in FIG. 5, according to one embodiment of the invention.
Figure 7:
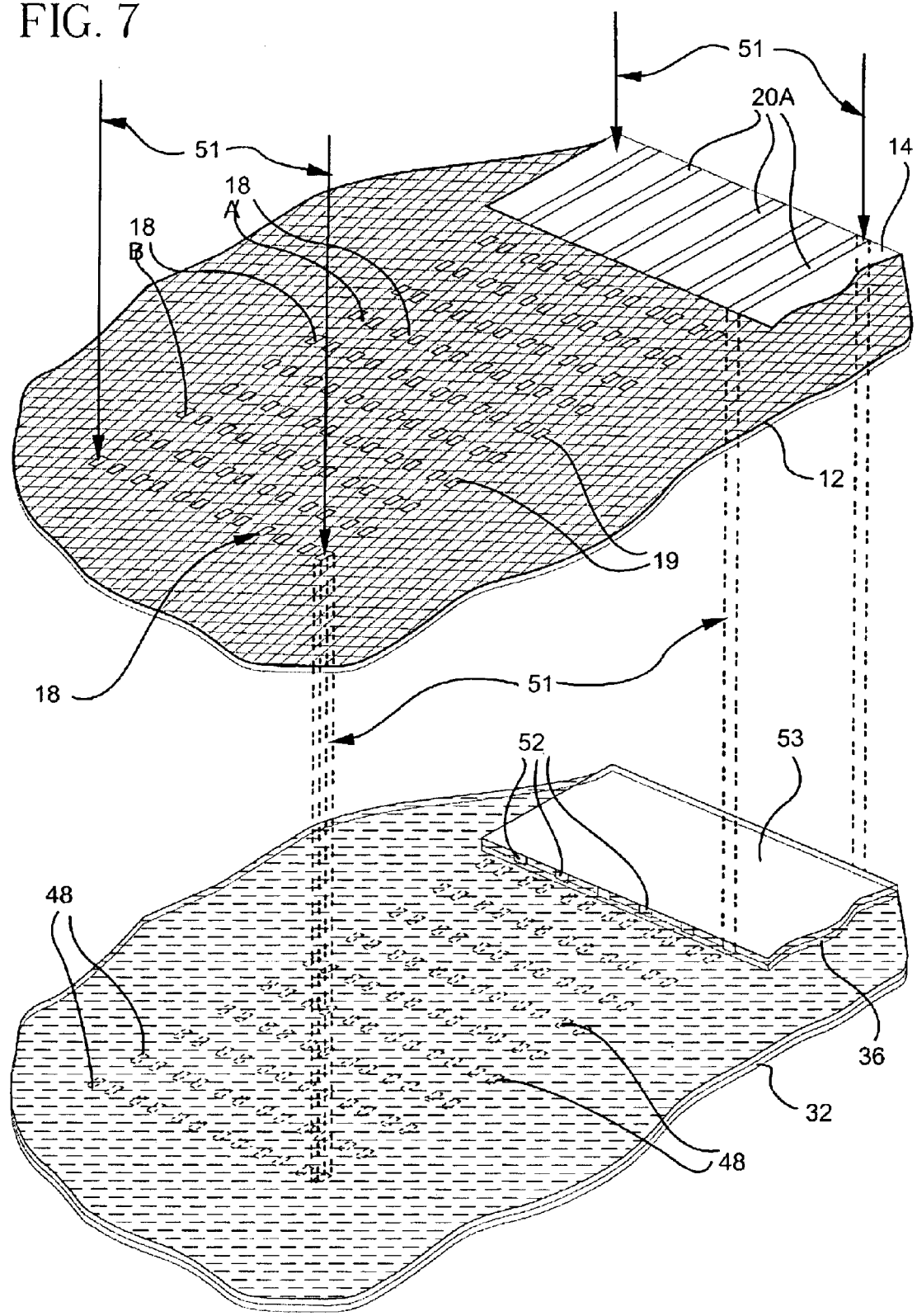
FIG. 7 is an enlarged, detailed partial perspective view of one section of the tool and the device substrate shown in FIG. 6.
Figure 8:
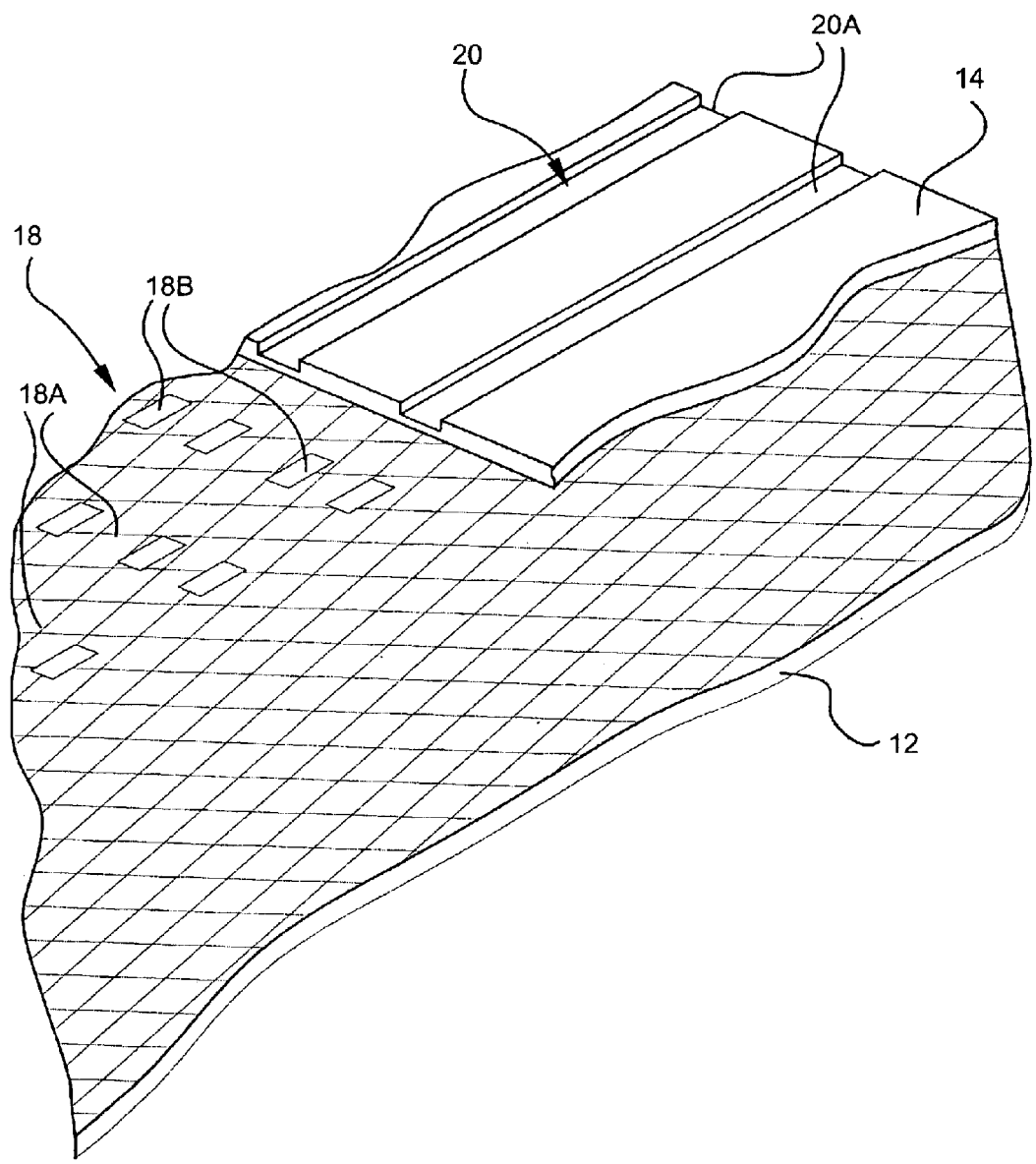
FIG. 8 is an enlarged, detailed partial perspective view of a portion of a section of the forming tool shown in FIG. 7 according to one embodiment of the invention.

FIG. 2 shows the tool 10 in a finished or ready-to-use configuration. The tool 10 with the stepped surface region 14, also includes in the non-stepped portion of the substrate at least one pattern mask region 18 for forming gripping elements formed on a generally planar main portion of the tool. Preferably, the tool 10 includes a plurality of pattern mask regions 18 arranged in a row or column on the non-stepped portion of the tool substrate 12. Each pattern mask region 18 shown in FIG. 2 includes a pattern of masked areas 18A and unmasked areas 18B (as shown in detail in FIGS. 7 and 8) configured to form flexible optical fiber gripping elements having channels for securing the optical fibers to a substrate. Each pattern mask region can include a single row of unmasked areas for forming a single row of gripping elements on the device substrate (not shown in the Figures), or a plurality of rows of unmasked areas 18B for forming multiple rows of gripping elements on the device substrate, as shown in FIGS. 7 and 8. As will be described in more detail below, the gripping elements on the device substrate are formed by curing material such as UV curable liquid, and using a UV light source to cure material positioned beneath the unmasked regions 18B of the pattern mask regions 18 of the tool; this process is shown and described in more detail in referring to FIGS. 7 and 8. The pattern masks regions 18 formed on the tool substrate 12 surface can be formed by masking and lithography techniques known in the art of semiconductor processing. The masked areas are typically covered with a layer of chrome and are opaque while the unmasked areas are uncoated and essentially transparent. The tool embodiment shown in FIG. 2 further includes a plurality of waveguide-forming regions 20 formed in the stepped region 14. As will be described in more detail below, according to some embodiments, each waveguide-forming region 20 includes a plurality of waveguide forming channels or trenches 20A, which are used in the formation of planar waveguides on a device substrate that are pre-aligned with the gripping elements. The waveguide forming channels or trenches 20A (shown in FIG. 7) can be formed using conventional microelectronic processes such as masking and etching or other suitable techniques. As will be discussed in more detail below with respect to FIGS. 5–9, the waveguide forming channels or trenches 20A are filled with a curable material that may be partially or fully cured to form a waveguide core and then deposited on the device substrate.

Figure 3:
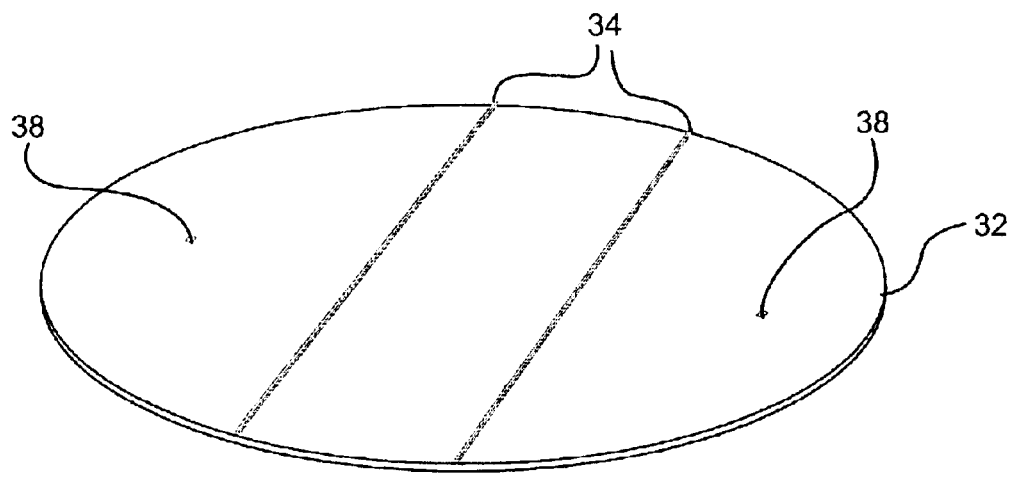
FIG. 3 is a perspective view of a device substrate according to one embodiment of the invention.
Figure 4:
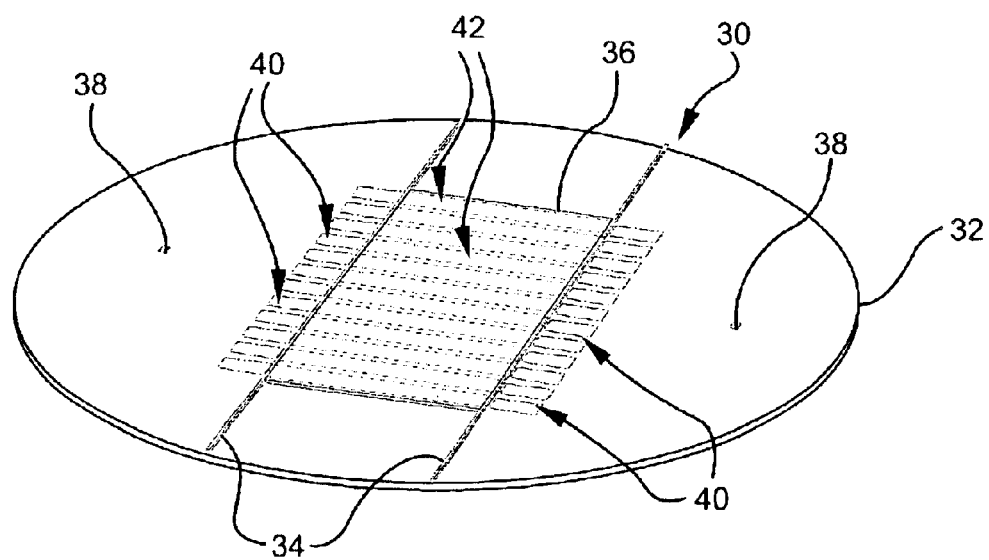
FIG. 4 is general perspective view of a planar optical device according to one embodiment of the invention.

FIG. 3 is a general perspective view of a device substrate 32 that is subsequently formed into a planar optical device 30, a general perspective view of which is shown in FIG. 4. FIG. 3 shows an unfinished device substrate 32 prior to its formation into the device 30. Substrate 32 can be formed from any solid material used in the formation of substrates for conventional optical waveguide devices. Desired characteristics of these materials include mechanical and optical stability at typical operating temperatures of the device. Preferred materials for use in the fabrication of substrate 32 include printed circuit board materials, polymers, quartz, glass, fused silica, semiconductor wafers and inorganic crystals. According to the embodiment shown in FIG. 3, the substrate 32 includes a pair of rails or raised features 34 which are used to form a plateau region 36 on the substrate. The substrate 32 also includes reference points 38 that are used to align the device substrate with the reference marks 16 of the tool substrate 12. FIG. 4 shows a general view of the device 30 in a finished configuration. The device 30 includes a plurality of gripping element regions 40 including gripping elements adapted to hold optical fibers on the substrate surface and a plurality of waveguide regions 42 including a plurality of waveguides located on the plateau region 36. Details of the tool 10 and the device 30 and example of methods for their manufacture will be discussed below.

Figure 5:
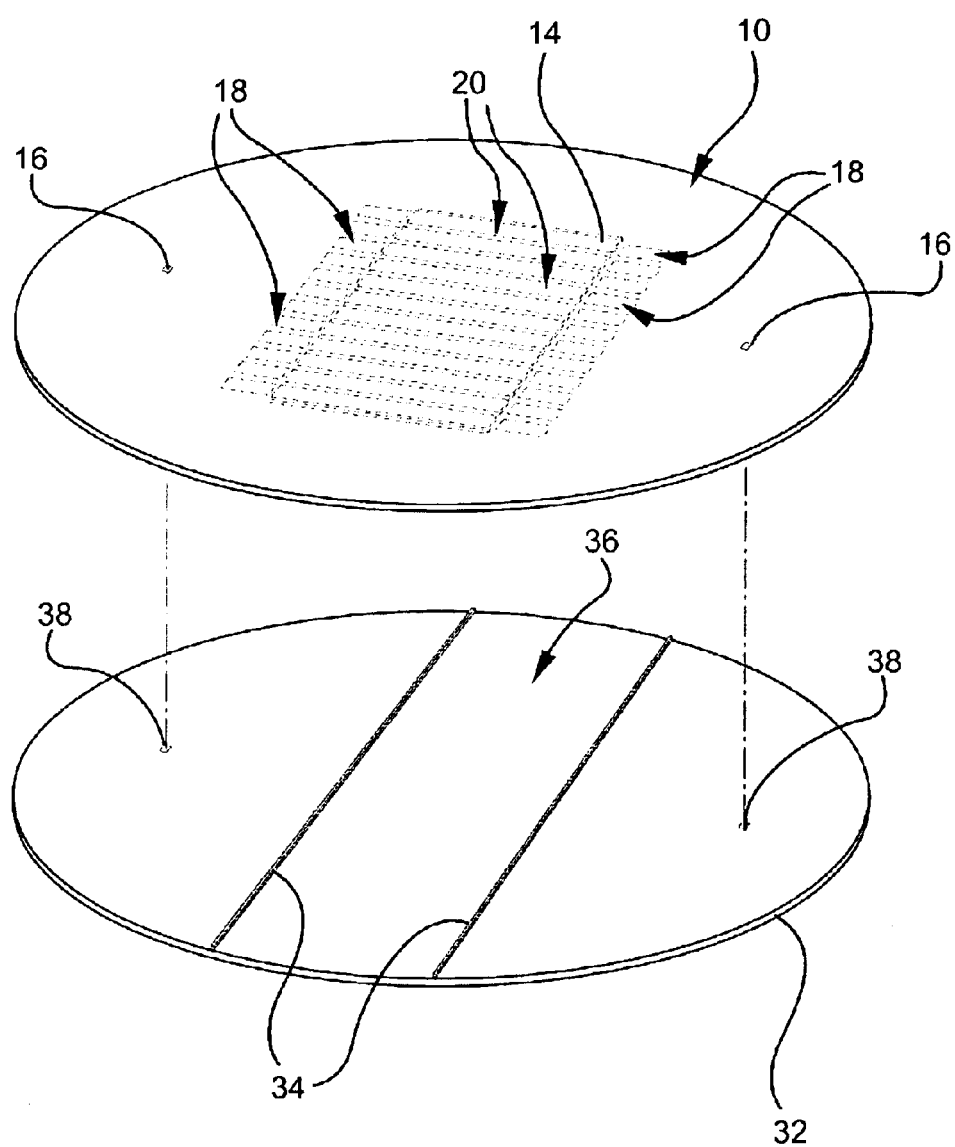
FIG. 5 is a general perspective view of a manufacturing step showing a tool positioned over a device substrate according to one embodiment of the invention.

A method of manufacturing a pigtailed planar optical device according to one embodiment of the invention will now be discussed with specific reference to FIGS. 5 through 9. FIGS. 5–7 show the tool 10 including the stepped region 14 waveguide-forming regions 20, each waveguide-forming region 20 including a plurality of waveguide forming trenches or channels 20a formed in the stepped region 14. The height of the stepped region 14 and the rails 34 on the device substrate 32 control the height of the optical fiber gripping elements formed on the device substrate. Those skilled in the art will appreciate that vertical alignment of an optical fiber inserted in the optical fiber gripping elements with a waveguide on the device substrate can be controlled by changing the height of the optical fiber gripping elements and/or changing the height of plateau region 36 on the device substrate. The tool further includes pattern mask regions 18 including masked areas 18A and unmasked areas 18B for forming gripping elements.

Specifically referring to FIGS. 6–8, in use, the tool 10 is positioned or placed over the device substrate 32 including rails or raised elements 34. The tool 10 including stepped region 14 is positioned so that the stepped region 14 is facing towards the device substrate 32. The tool 10 and the device substrate 32 are placed in contact so that the stepped region 14 rests upon the rails or raised features 34, forming a cavity into which of curable material is deposited and cured to form plateau region 36.

Still referring to FIGS. 6 and 7, which illustrate the formation of a planar optical waveguide device by using an ultraviolet (UV) light 50 source. The UV light source directs UV light 51 to cure a UV curable material to form a plurality of gripping elements 48 and the plateau region 36. According to one embodiment of the invention, a first layer of curable material is deposited on the substrate in the space between the rails or raised elements 34 and between the substrates 12 and 32. According to this embodiment, this cured layer of material forms the plateau region or underclad portion 36 on the surface of the device substrate. In addition, the material provides a planar waveguide underclad portion 36, which will be described in more detail below. The plateau region or underclad portion 36 material is chosen to provide for low propagation loss waveguide structures and is chosen with respect to the material used to form the planar waveguide cores discussed in more detail below. Illustrative materials used in the fabrication of plateau region or underclad portion 36 are low refractive index photopolymers, spin-coated polymer layers, spin-on glasses, silicon dioxide, oxides formed by chemical vapor deposition (CVD) and fluoropolymers. Depending on the type of material used, the material deposited in the plateau region is cured by thermal means or by using ultraviolet light to provide a solid mass of material to form the plateau region 14.

In preferred embodiments, the UV light source 50 is a collimated UV light source. It will be understood that the invention is not limited to UV curing of the gripping elements, and other forming methods can be used to form and cure the gripping elements and the waveguides. The tool 10 is placed in alignment with the device substrate 32 by aligning the reference marks 16 on the tool 10 with the reference marks 38 on the device substrate 32. In the view shown in FIGS. 6 and 7, the device substrate 32 and the tool substrate 12 are shown after they have been separated and waveguide cores 52 have been formed on the plateau region 36 of the device substrate 32. Gripping elements 48 have been formed adjacent to the plateau region 36. Prior to exposure to the UV light 50, the tool substrate 12 and the device substrate 32 are placed in contact such that the stepped region 14 of the tool substrate 12 rests on the guide rails or raised elements 34 on the device substrate 32 as previously described. After the device substrate 32 and the tool substrate 12 have been placed in contact, both the aforementioned cavity region and the region of the device substrate surrounding the guide rails are filled with curable material. The curable material in these two regions do not necessarily need to be the same. When UV light is applied to the tool 10, the waveguides 52, which will be discussed in more detail below, are formed on the plateau region 36 simultaneously with the formation of the gripping elements 48. The UV light projects through the transparent, unmasked regions 18B that form the gripping element pattern on the substrate 12 of the tool 10 and the UV light cures the curable material on the surface of the device substrate 32 to form gripping elements 48.

Ultraviolet light 51 which passes through the unmasked areas 18B of the pattern mask regions 18 causes a photopolymerization reaction in the regions of the curable material which are directly under those image or unmasked areas 18B. No photoreaction occurs in those areas of monomer layer which are shielded from the UV light by the opaque masked areas 18A of the mask pattern region 18. The gripping elements 48 which define channels 62 (shown in FIGS. 9A and 9B) preferably have trapezoidal or substantially trapezoidal cross section upon removal of the uncured material as will be later described. The simplicity and the great alignment accuracy which is possible with lithographic methods of the present invention, allows the method of the present invention to overcome many of the drawbacks of prior methods for aligning fibers to optical devices. The unique trapezoidal geometry of gripping elements 48 can be achieved by the choice of proper conditions of irradiation. The optical absorption of the unreacted curable material at the wavelengths of the UV light must be high enough, such that a gradient of UV light intensity is established through the cured material. That is, the amount of UV light available in the curable material to cause the initiation of the photoreaction will decrease from the top, or the image mask side, towards the bottom, or the substrate side, due to the finite absorption of the curable material. This gradient of UV light causes a gradient in the amount of photopolymerization reaction that occurs from top to bottom, and this results in the unique trapezoidal geometry of the developed gripping element structure.

FIG. 8 shows a detailed partial perspective view of a portion of a single waveguide forming region 20 and a single mask pattern region 18 of a tool 10 in accordance with one embodiment of the invention. A mask pattern region 18 includes a plurality of unmasked areas 18B on the surface of the substrate. The stepped region 14 of the tool includes at least one waveguide forming region 20, each region including at least one, and preferably a plurality of trenches 20A for forming planar waveguide cores 52 (shown in FIG. 9). In one embodiment of the invention, the trenches 20A can be formed by etching, for example, reactive ion etching the trenches 20A to the desired width and depth dimensions. Other techniques known in the art can be used to form the channels. Thereafter, curable materials such as a suitable polymer or monomer can be used to fill the channels and later form the waveguide cores. In the manufacture of the waveguide cores 52 shown in FIG. 9, it may be desirable to use a doctor blade process known in the art to fill the trenches 20A with the curable material. After the trenches 20A have been filled with a curable material, the material can be either fully or partially cured thermally or with UV light. In a subsequent manufacturing step, when the stepped region 14 of the tool 10 and the plateau region or underclad portion 36 of the device are brought into contact and UV light is applied to form the gripping elements, the waveguide cores are transferred and bonded onto the surface of the plateau region or underclad portion 36. While the present invention should not be limited by a particular theory of operation, it is believed that the waveguide cores 52 are chemically bonded or adhered to the plateau region or underclad portion 36 on the device substrate during curing of the plateau region or underclad portion.

Referring now to FIGS. 9–13, after UV light has been applied to form gripping elements 48 and waveguide cores 52 on the device substrate 32, the uncured material is removed from the surface of the device substrate using an appropriate solvent. Thereafter, the guide rails or raised features can be removed by a variety of techniques such as by using a saw or laser. Specifically referring to FIGS. 10 and 11, according to preferred embodiments, each gripping element 48 includes at least a pair of flexible sidewalls 60 defining a gripper channel 62, and each array of gripping elements forms a plurality of gripper channels 62 on the surface of the substrate 32 adapted to hold an array of optical fibers.

Figure 12:
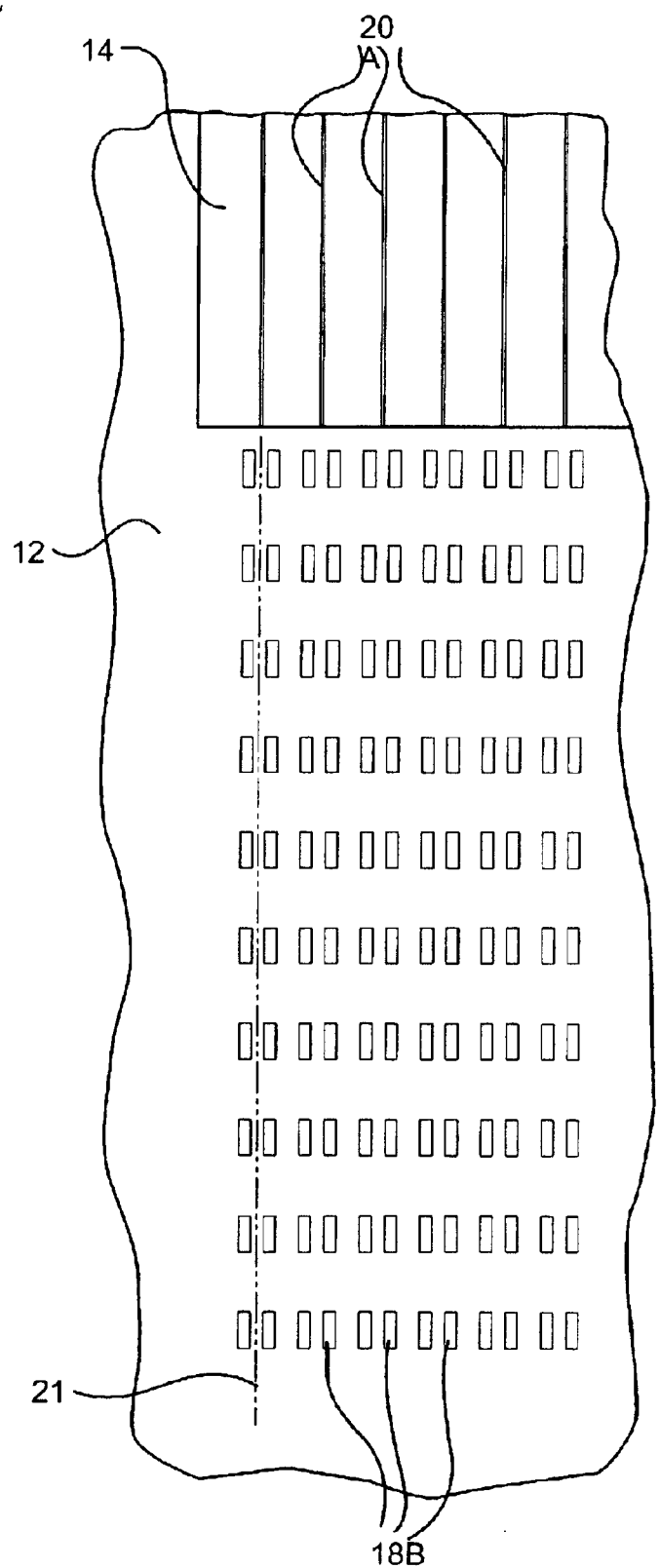
FIG. 12 is an enlarged partial top plan view of a tool according to one embodiment of the invention.
Figure 13:
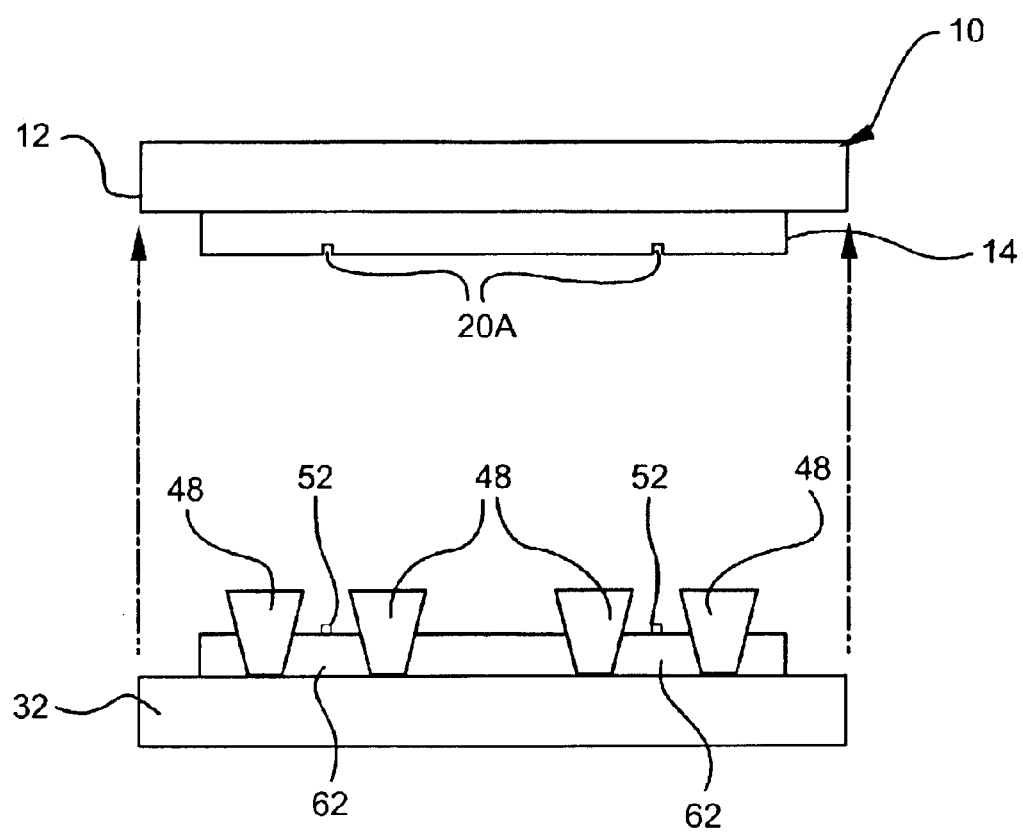
FIG. 13 is an end view of a forming tool and a planar optical device according to one embodiment of the invention.
Figure 14:
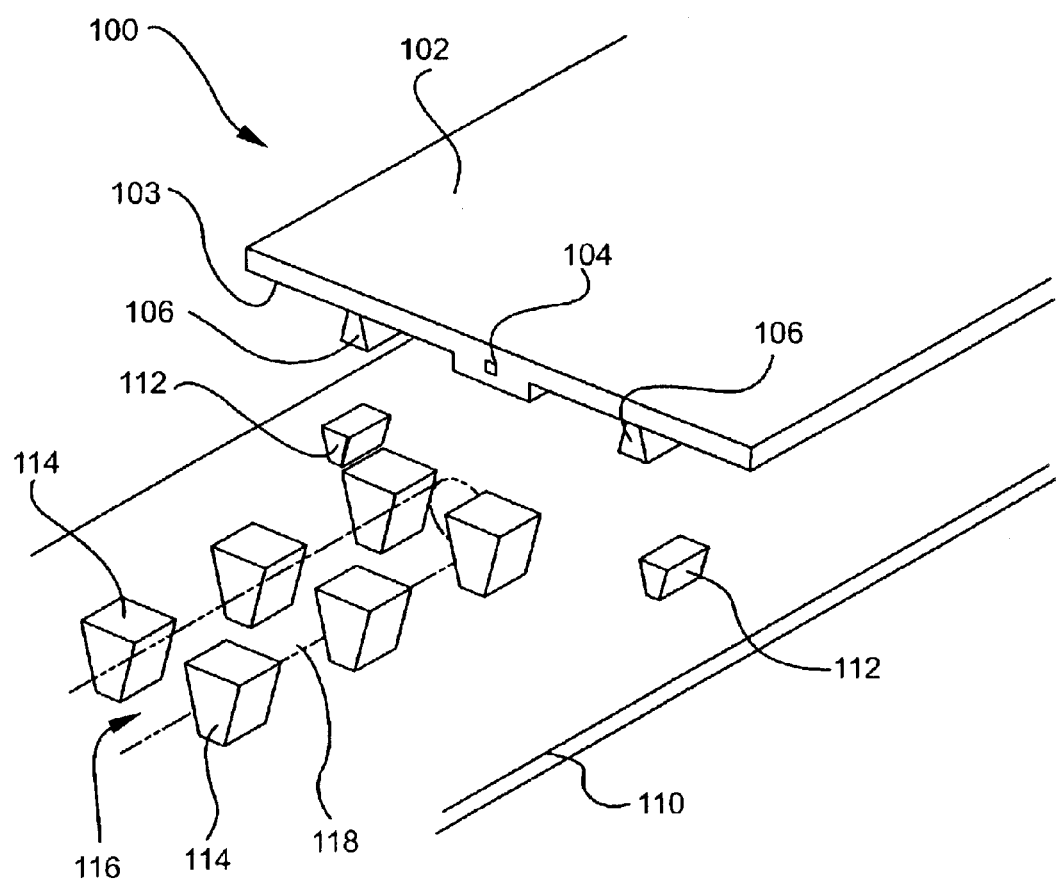
FIG. 14 is a partial perspective view of a planar optical device including a top portion and a bottom portion prior to assembly according to one embodiment of the invention.
Figure 15:
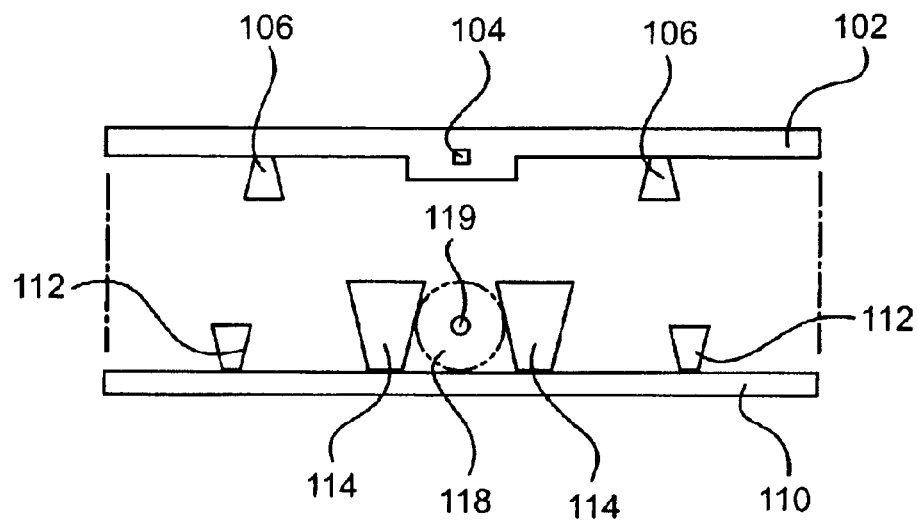
FIG. 15 is an end view of a planar optical device prior to assembly according to one embodiment of the invention.

In the embodiments shown, the gripper channels 62 are defined by a plurality of segmented gripper elements 48. It will be appreciated that the gripper channels can be formed by a pair of unitary gripping elements as well (not shown), as well as the aforementioned plurality of segmented gripping elements. Referring to FIG. 12, the gripper channels 62 are positioned on the surface of substrate 32 such that their longitudinal axes are in alignment or substantially in alignment with waveguide cores 20 formed on the plateau region 36. Accordingly, when an optical fiber 64 is secured in one of the gripper channels 62, the optical fiber 64 and a planar waveguide core 20 aligned with the gripper channel 62 will be optically aligned horizontally and vertically. Because the tool including the rows of unmasked areas 18B for forming gripping elements and the waveguide forming trenches 20A are patterned onto a mask using photolithographic techniques, the planar waveguide cores 52 can be aligned with the so-formed gripper channels 62 in a single forming step with a high degree of accuracy, and typically to tolerances of between about 100 nm and 1 micron. FIG. 12 shows a top view of a portion of the tool 10, and the centerline 21 between the plurality/rows of unmasked areas 18B are aligned with the waveguide forming trenches 20a used to form waveguide cores 52. By using photolithography to form the gripping elements and a single tool 10 to form both the gripping elements and the waveguide cores 52, optical fibers 64 secured in the gripper channels 62 will be passively aligned with the waveguide cores 52 in a single forming step. FIG. 13 shows a side or end view of the tool 10 with the waveguide channels 20 formed in the stepped region 14 positioned above a device 30 immediately after removal from the device substrate 32 after formation of the device 30. The waveguide cores 52 are positioned in the center of the gripper channels 62 formed by the gripping elements 48. One advantage of this embodiment of the invention is that two separate features, i.e., polymeric waveguide cores 52 and optical fiber gripping elements 48 can be simultaneously formed on a device substrate 32, with the features having different heights on the device substrate 32. In addition, according to certain embodiments of the invention, different material systems and different forming methods, for example, photolithography and embossing or molding can be combined and performed simultaneously to form precisely aligned optical fiber gripping elements and planar waveguides. According to certain embodiments, after the gripping elements 48 and planar waveguide cores 52 have been formed on the device substrate, another layer of cladding material 53 can be applied over the planar waveguides, as shown in FIG. 9B. The overclad layer material 53 is chosen to provide for low propagation loss waveguide structures and is chosen with respect to the material used to form the planar waveguide cores. The same overclad material can simultaneously be applied over the installed optical fibers to be used as adhesive if desired. In other embodiments, an overclad layer is not formed over the waveguide cores, and air can function as a cladding material for the waveguides.

Figure 9A:
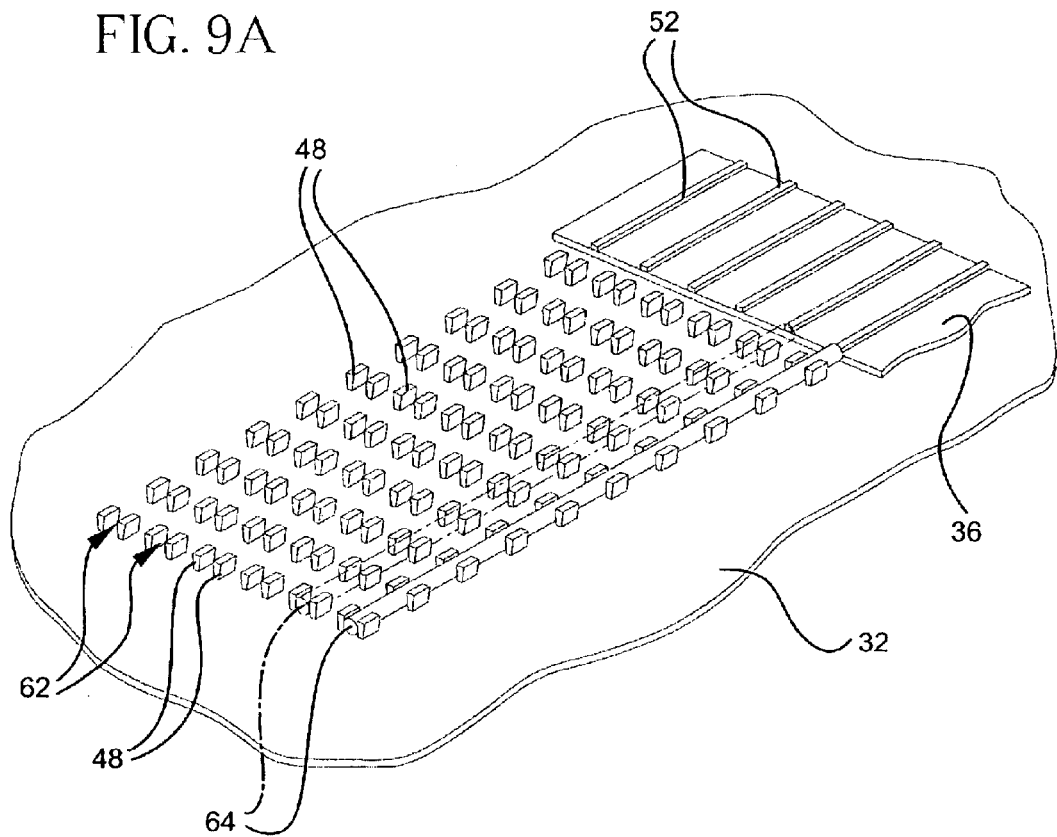
FIG. 9A is a partial perspective view of a planar optical device according to one embodiment of the invention.
Figure 9B:
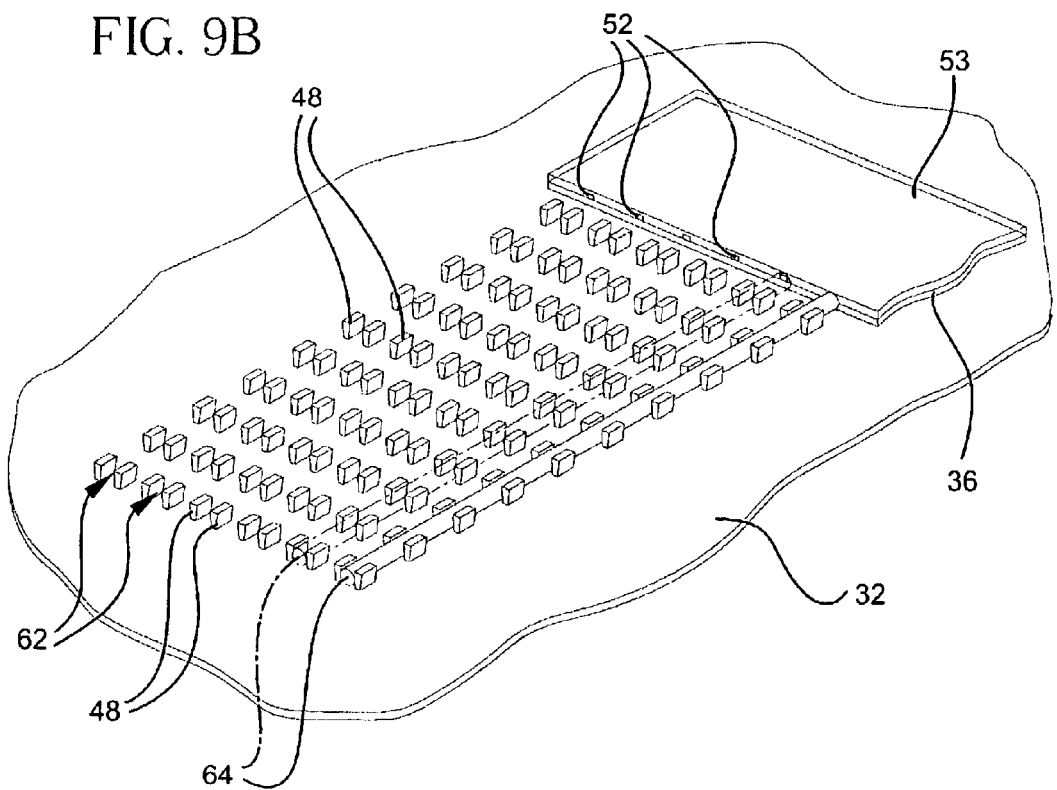
FIG. 9B is a partial perspective view of a planar optical device including an overclad layer over the planar waveguides according to one embodiment of the invention.
Figure 10:
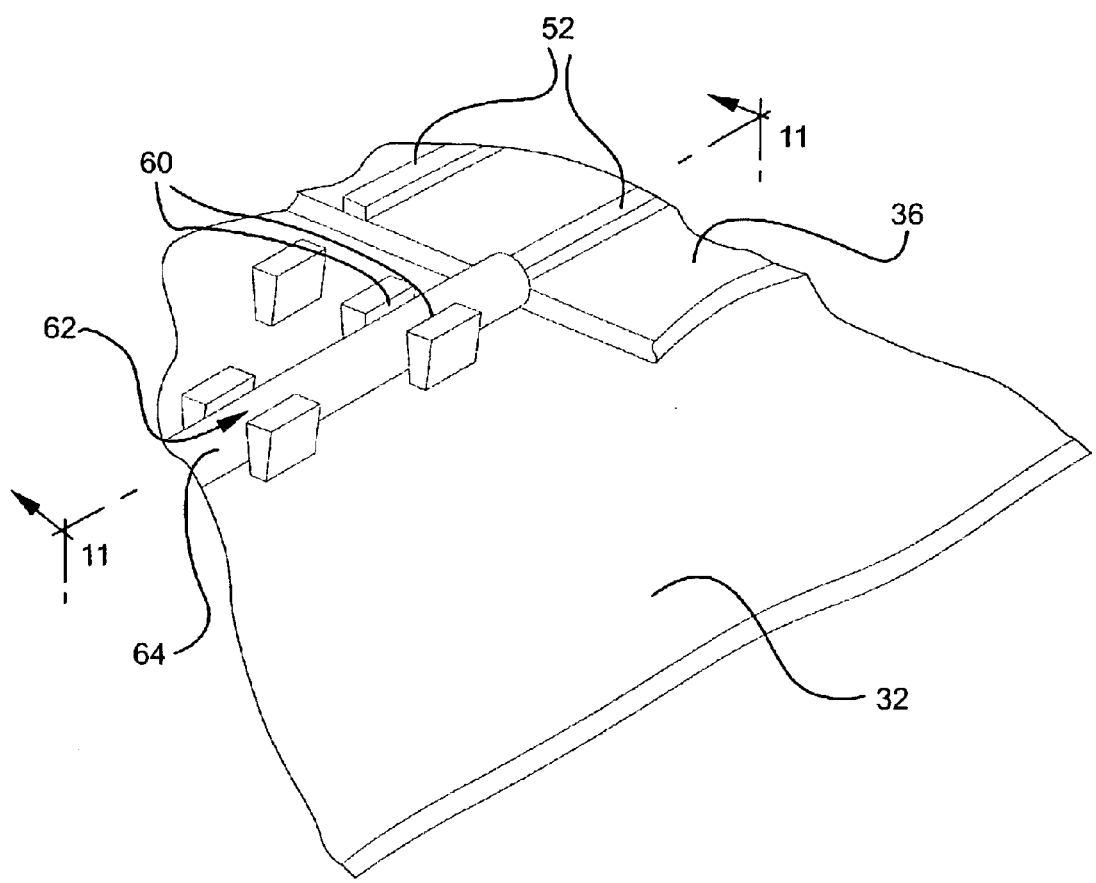
FIG. 10 is an enlarged, detailed partial perspective view of a portion of a planar optical device shown in FIG. 9.
Figure 11:
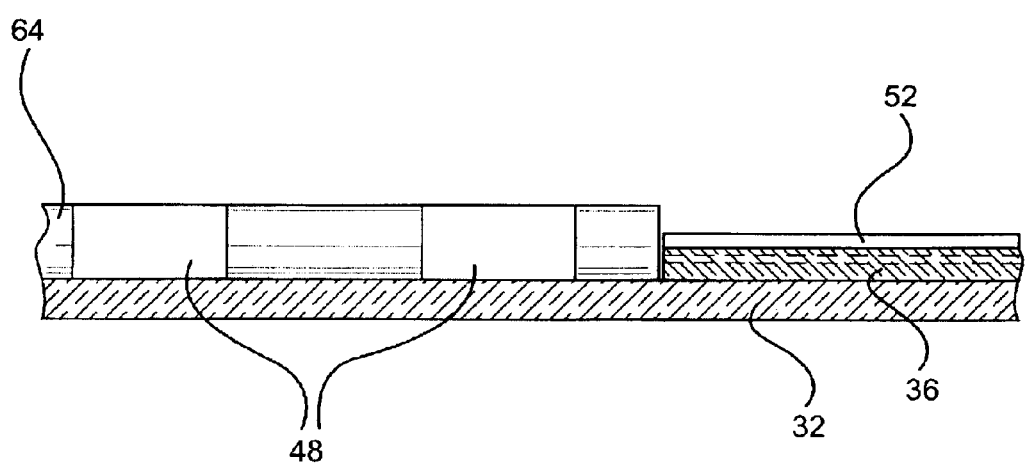
FIG. 11 is a sectional view taken along line 11—11 of FIG. 10.

Referring to FIGS. 9A and 9B, according to certain embodiments, a plurality of planar waveguide cores 52 on an underclad region 36 is provided with an aligned plurality of the gripping elements 48 of the present invention. Each pair of elements 48 is centered on, and parallel to, the centerline of the end of optical waveguide core 52 with which it is associated, the alignment preferably being accomplished by known methods of the art as for example by lithography, such as by utilizing exposure masks which also contain registration marks thereon. The end of optical fiber 64 is shown to be inserted into one of the gripper channels 62 formed by gripping elements 48 such that the light carrying core of fiber 64 is aligned and centered on the end of planar waveguide core 52. Optical fiber 64 is held firmly in the channel by the retaining force exerted upon it by the gripping elements without the necessity of additional elements or optical glues or melting. This firm positioning allows additional optical fibers 64 to be placed in nearby gripper channels 62 without disturbing the positioning of optical fiber 64 which is already in place. This provides for a greatly increased ease of fabrication for attaching optical fibers 64 to planar waveguide cores 52 over prior methods. Also provided is the ability to introduce each of a plurality of optical fiber individually into individual gripper channels 62 to provide an array of fibers, thus overcoming the cumulative positioning error associated with prior art methods wherein all of the fiber that comprise an optical fiber array must be loaded simultaneously. The tool with a stepped region allows the gripping elements 48 and the waveguide cores 52 to be formed and provides for accurate horizontal and vertical alignment.

Figure 16:
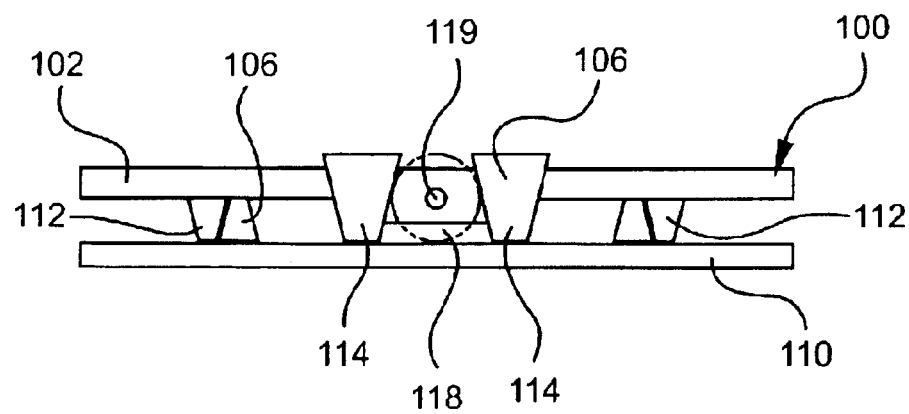
FIG. 16 is an assembled end view of a planar optical device according to one embodiment of the invention.
Figure 17:
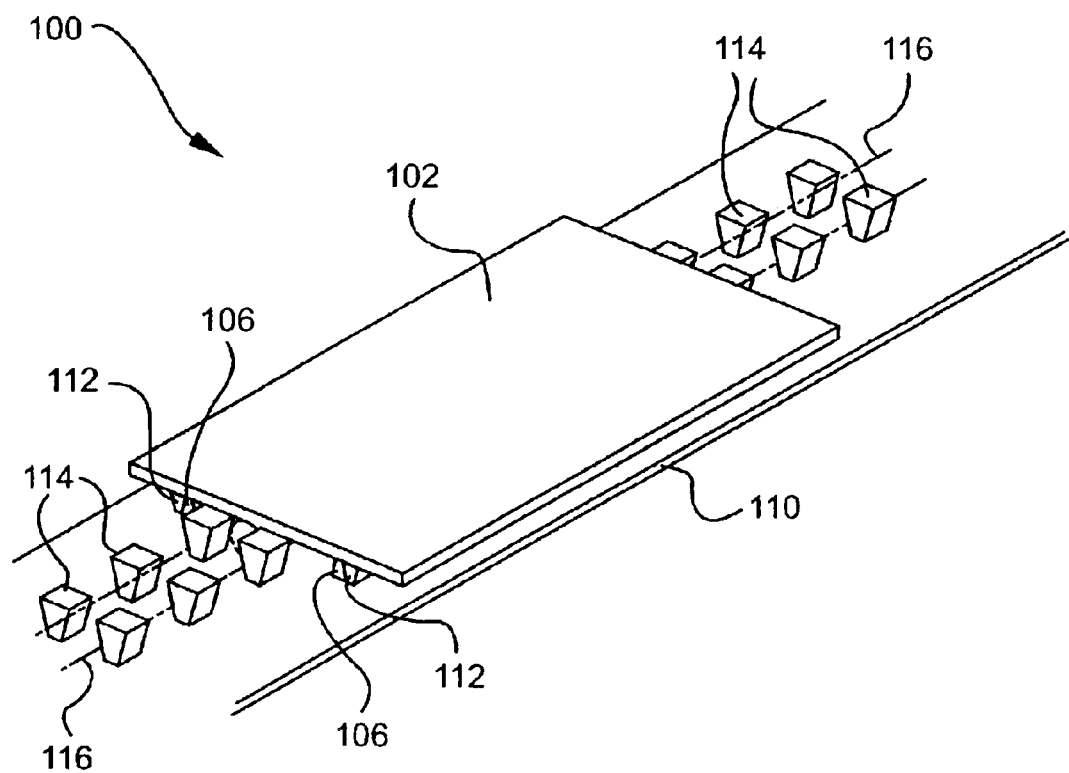
FIG. 17 is a perspective view of a planar optical device according to one embodiment of the invention.

Another embodiment of the invention will now be described with respect to FIGS. 14–18. A pigtailed planar optical device 100 is shown in FIGS. 14–17. The device 100 includes a first portion comprising a planar substrate 102 having an optical element 104 thereon. In the embodiment shown in FIGS. 14–17, the optical element 104 is a planar waveguide, and the planar substrate 102 may be referred to as a waveguide substrate. However, it will be understood that the optical element could be a wide variety of optical elements, including, but not limited to waveguide couplers, switches, grating controllers, amplifiers, modulators, mode converters, and isolators. The first portion also has at least a first pair of locking grippers 106 formed on a substrate surface 103 of the first portion. A second portion of the device 100 includes a base or device substrate 110 having a second set of locking grippers 112 thereon. The first set of locking grippers 106 and the second set of locking grippers 112 are positioned and adapted to cooperate with each other to secure or lock the first portion and the second portion together as shown in FIGS. 16 and 17. The second portion further includes a plurality of flexible gripping elements 114 that define gripping channels 116 adapted to receive and secure optical fibers 118 therein. When the first portion and the second portion are secured together, the core 119 of the optical fibers and the planar waveguide core 104 are optically aligned or substantially optically aligned.

According to the embodiments shown in FIGS. 14–17, the optical fiber gripping elements 114 and the locking grippers 112 can be formed on base substrate to provide the second portion of the device by utilizing curable materials and forming techniques similar to those discussed above, with the following modifications. The locking grippers 112 and the optical fiber gripping elements 114 on the substrate 110 forming the second portion can be made using a forming tool with a stepped region, similar to the process described above with respect to FIGS. 1–8. Since the fiber gripping elements 114 have a height greater than the locking grippers 112, a photolithographic forming tool having a stepped region thereon is utilized to form the multiple height features on the substrate 110. The multiple height forming tool is advantageous because multiple height features can be formed on a device substrate in a one step photolithographic process.

Figure 18A:
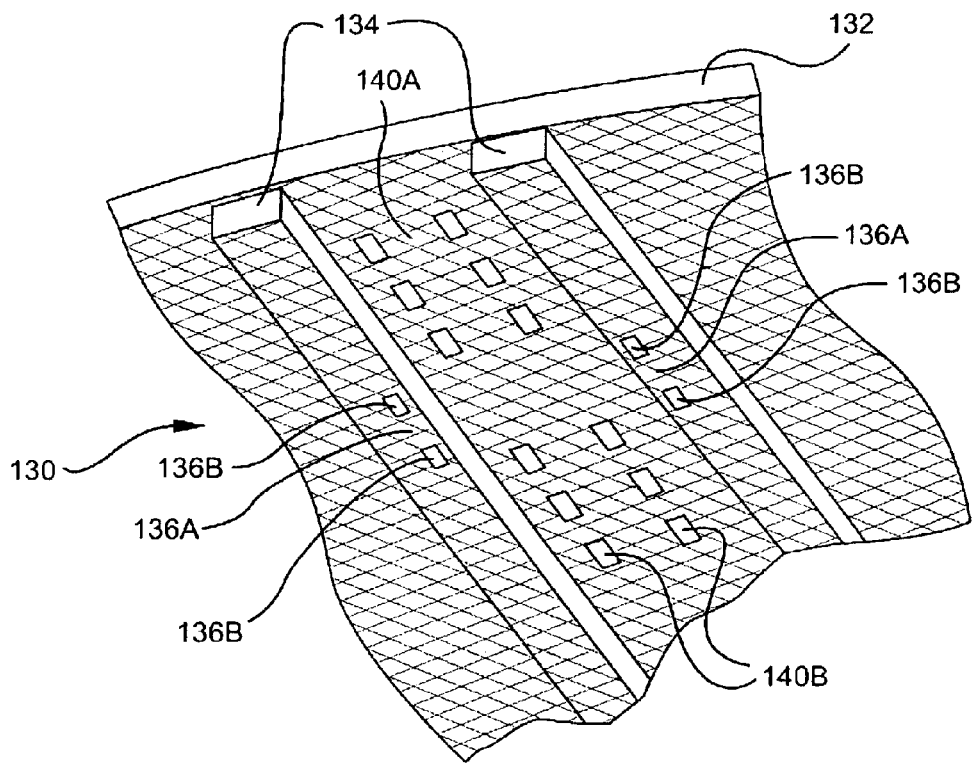
FIG. 18A is a perspective view of the underside of a tool used to form the bottom portion of the planar optical device shown in FIGS. 14–17.
Figure 18B:
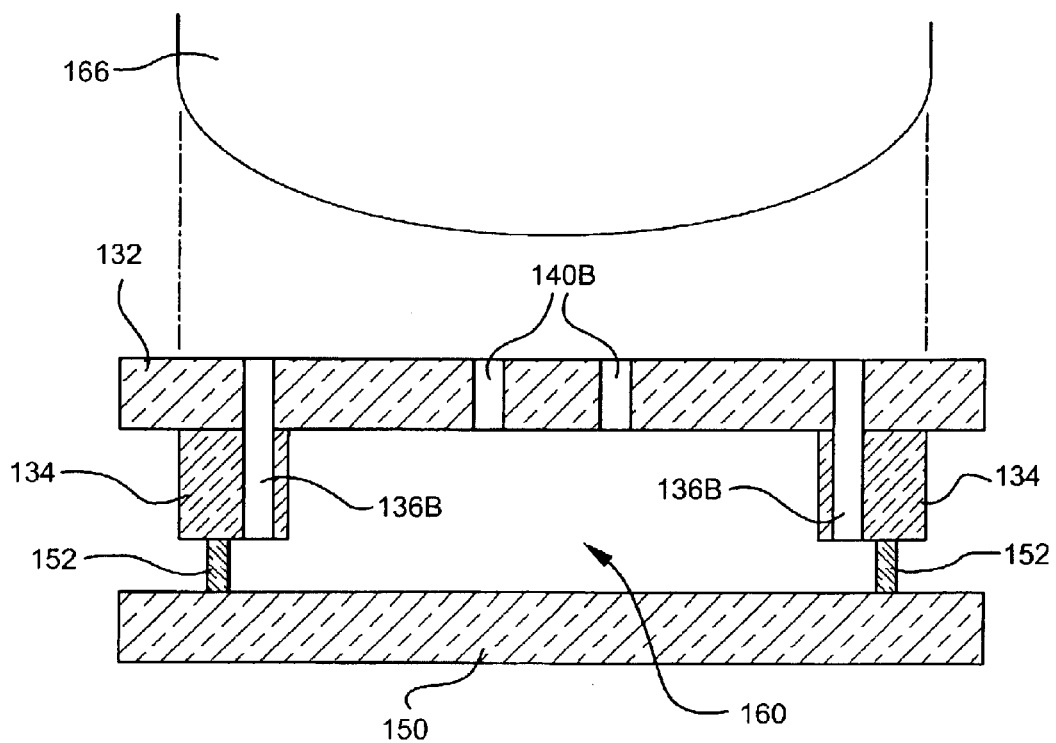
FIG. 18B is an end view of a manufacturing step used to form the bottom portion of the device in FIGS. 14–17 showing the tool shown in FIG. 15A positioned over a device substrate.

Referring to FIGS. 18A and 18B, a portion of a forming tool 130 is shown that includes a tool substrate 132 and a pair of stepped regions 134 are used to form the device shown in FIGS. 14–17. In this embodiment, two stepped regions 134 are provided and spaced apart on the substrate. The stepped regions 134 include mask patterns 136 that include masked areas 136A and unmasked areas 136B. The device substrate also includes mask patterns 140 that include masked areas 140A and unmasked areas 140B. Referring to FIG. 18B, a device substrate 150 including guide rails 152 is provided. The spacing of the guide rails 152 on the device substrate 150 is such that the stepped regions 134 of the tool 130 rest on the guide rails 152 to provide a cavity 160 defined by the guide substrates 132, 150, the guide rails 152 and the stepped regions 134. Curable material is placed in the cavity 160, and a UV light source 166 is directed on the tool. UV light passes through the unmasked areas 140B to define and form optical fiber gripping elements 114, and UV light passes through unmasked areas 134B to form locking grippers 112. Because the spacing between the stepped region 134 and the device substrate 150 is less than the spacing between the tool substrate 132 and the base substrate, the height of the locking grippers 112 will be less than the height of the optical fiber gripping elements 114. Thus, the forming tool including a stepped region enables the formation of an optical device substrate having features with different heights. An example of such a device is shown in FIGS. 14–17.

The first portion of the device shown in FIGS. 14–17 can be formed by using lithographic techniques to form the waveguide 104 on the substrate 102. The locking grippers on the substrate 102 can be formed using a pattern mask having masked and unmasked regions. After formation of the first and second portions, the two portions can be assembled as shown in FIGS. 16 and 17 so that the waveguide 104 is aligned with the fiber gripper channel 116.

It will be appreciated that according to certain embodiments of the present invention, a wide variety of devices can be fabricated by utilizing the locking grippers disclosed herein. Because the forming processes for forming gripping elements and grippers are adaptable to a wide variety of surfaces and materials, the gripping elements and locking grippers can be formed on a wide variety of device surfaces to interlock and align a wide variety of optical elements. For example, a semiconductor substrate including a planar waveguide could have locking grippers formed thereon that could be interlocked with another substrate having complementary locking grippers. Although the embodiment shown in FIGS. 14–17 specifically relates to alignment of an optical waveguide chip with a substrate having optical fibers, other optical elements could be aligned with pigtailed optical fibers. Additionally, the grippers described herein can be used to align fibers to planar waveguides and devices including platforms with wirebonded electrical contacts already in place. Another use for the locking grippers of the present invention is the packaging of active components such as a pump laser die. Typically, these devices use special focusing lensed fibers to increase coupling efficiency from the device to a single mode fiber. Use of locking grippers can make packaging of such devices simpler.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of forming a planar optical device, comprising:

placing a tool substrate over a device substrate, the tool substrate having a first region for forming a planar waveguide device and a second region for forming a plurality of flexible optical fiber gripping elements, wherein the tool substrate is placed over the device substrate such that a cavity forms between the first region and the device substrate;

depositing a first curable material in between the first region and the device substrate and curing the first curable material such that the planar waveguide device forms on the device substrate;

depositing a second curable material in between the second region and the device substrate and curing the second curable material such that the flexible optical fiber gripping elements form on the device substrate; and removing the tool substrate from the device substrate;

wherein the flexible optical fiber gripping elements and the planar waveguide device form on the device substrate such that when optical fibers are within the flexible optical fiber gripping elements the optical fibers and the planar waveguide device are optically aligned horizontally and vertically.

2. The method of claim 1, wherein the planar waveguide device comprises a plurality of waveguide cores such that when the optical fibers are within the flexible optical fiber gripping elements the optical fibers and the waveguide cores are optically aligned horizontally and vertically.

3. The method of claim 2, wherein prior to placing the tool substrate over the device substrate, a curable material is deposited in a plurality of trenches in the first region and partially or fully cured to form the waveguide cores.

4. The method of claim 3, wherein curing the first curable material comprises forming a planar waveguide underclad inside the cavity and transferring the waveguide cores onto the planar waveguide underclad.

5. The method of claim 4, wherein forming the planar waveguide underclad and transferring the waveguide cores occur substantially simultaneously.

6. The method of claim 1, wherein the flexible optical fiber gripping elements and the planar waveguide device form substantially simultaneously.

7. The method of claim 2, further comprising placing optical fibers within the flexible optical fiber gripping elements on the device substrate.

8. The method of claim 1, wherein the second region includes a mask for forming the flexible optical fiber gripping elements, the mask having a transparent area that permits transmission of light and an opaque area that blocks transmission of light, and wherein curing the second curable material includes exposing the second curable material to light through the transparent area of the mask.

9. The method of claim 8, further comprising removing the unexposed second curable material from the device substrate.

10. The method of claim 8, wherein exposing the second curable material to light is controlled such that the flexible optical fiber gripping elements formed on the device substrate have a trapezoidal geometry.

11. The method of claim 4, further comprising forming a planar waveguide overclad on the planar waveguide device.

12. A method of forming a planar optical device, comprising:

placing a tool substrate over a device substrate, the tool substrate having a first region with a first mask for forming flexible optical fiber gripping elements on the device substrate and a second region with a second mask for forming flexible locking grippers on the device substrate;

depositing a curable material between the tool substrate and the device substrate and exposing the curable material to light through transparent portions of the first and second masks;

removing unexposed portions of the curable material such that the flexible optical fiber gripping elements and the flexible locking grippers remain on the device substrate; and securing a planar substrate including an optical element and flexible locking grippers to the device substrate by mating the flexible locking grippers on the planar substrate with the flexible locking grippers on the device substrate.

13. The method of claim 12, further comprising placing an optical fiber within the flexible optical fiber gripping elements, wherein the flexible optical fiber gripping elements form on the device substrate such that the optical fiber is optically aligned with the optical element.

14. A tool for forming a planar optical device on a device substrate, comprising:

a generally planar tool substrate;

a first region on the tool substrate for forming a planar waveguide device on the device substrate, the first region comprising a plurality of trenches and a plurality of waveguide cores disposed in the trenches; and a second region on the planar substrate for forming a plurality of flexible optical fiber gripping elements having channels for holding optical fibers on the device substrate, the second region comprising transparent portions that allow transmission of light and opaque portions that block transmission of light;

wherein the first region and the second region have different heights relative to a surface of the tool substrate, and wherein the trenches and transparent and opaque portions are such that when the planar waveguide device and the flexible optical fiber gripping elements form on the device substrate the channels are substantially aligned with the waveguide cores.

* * * * *